US007925626B2

(12) United States Patent
Stock et al.

(10) Patent No.: US 7,925,626 B2
(45) Date of Patent: Apr. 12, 2011

(54) IMMEDIATE COPY TARGET PULL OF VOLUME DATA

(75) Inventors: Frederick G. Stock, Pittsburgh, PA (US); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 11/613,707

(22) Filed: Dec. 20, 2006

(65) Prior Publication Data

US 2008/0155212 A1 Jun. 26, 2008

(51) Int. Cl.
G06F 7/00 (2006.01)
G06F 17/00 (2006.01)
G06F 17/30 (2006.01)

(52) U.S. Cl. ........................................ 707/622; 707/770
(58) Field of Classification Search ...................... 707/10
See application file for complete search history.

(56) References Cited

U.S. PATENT DOCUMENTS

| 4,816,989 | A | * | 3/1989 | Finn et al. ...................... 709/248 |
| 5,799,322 | A | * | 8/1998 | Mosher, Jr. ..................... 707/202 |
| 5,799,323 | A | * | 8/1998 | Mosher et al. ................. 707/202 |
| 5,974,503 | A | * | 10/1999 | Venkatesh et al. ............. 711/114 |
| 6,161,193 | A | * | 12/2000 | Garg et al. ........................ 714/6 |
| 6,438,558 | B1 | | 8/2002 | Stegelmann |
| 6,507,883 | B1 | * | 1/2003 | Bello et al. ......................... 711/4 |
| 6,918,013 | B2 | * | 7/2005 | Jacobs et al. ................... 711/145 |
| 7,478,059 | B2 | * | 1/2009 | Crocitto ........................... 705/26 |
| 7,500,020 | B1 | | 3/2009 | Kabra et al. |

| 2001/0039581 | A1 | | 11/2001 | Deng et al. |
| 2002/0133491 | A1 | * | 9/2002 | Sim et al. ......................... 707/10 |
| 2002/0169777 | A1 | * | 11/2002 | Balajel et al. .................... 707/10 |
| 2003/0023898 | A1 | * | 1/2003 | Jacobs et al. ...................... 714/15 |
| 2003/0028538 | A1 | * | 2/2003 | Eikenbery ........................ 707/10 |
| 2003/0051102 | A1 | * | 3/2003 | Jacobs et al. .................... 711/145 |
| 2003/0093476 | A1 | | 5/2003 | Syed |
| 2003/0105934 | A1 | * | 6/2003 | Kimura et al. ................. 711/167 |
| 2004/0049649 | A1 | * | 3/2004 | Durrant ......................... 711/165 |
| 2004/0059805 | A1 | * | 3/2004 | Dinker et al. .................. 709/223 |
| 2004/0223504 | A1 | * | 11/2004 | Wybenga et al. ............. 370/412 |
| 2005/0071588 | A1 | * | 3/2005 | Spear et al. .................... 711/162 |
| 2005/0138635 | A1 | * | 6/2005 | Auerbach et al. ............. 719/315 |
| 2005/0229021 | A1 | * | 10/2005 | Lubbers et al. ................... 714/2 |
| 2005/0235047 | A1 | * | 10/2005 | Li et al. ......................... 709/219 |
| 2005/0262097 | A1 | * | 11/2005 | Sim-Tang et al. ............... 707/10 |
| 2006/0047720 | A1 | * | 3/2006 | Kulkarni et al. ............... 707/204 |
| 2006/0168154 | A1 | | 7/2006 | Zhang et al. |
| 2007/0061863 | A1 | * | 3/2007 | Rajasekaran ..................... 726/2 |
| 2007/0067263 | A1 | * | 3/2007 | Husain et al. ..................... 707/2 |
| 2007/0094456 | A1 | * | 4/2007 | Matsui et al. ................. 711/154 |
| 2007/0226437 | A1 | * | 9/2007 | McClure ........................ 711/162 |

(Continued)

*Primary Examiner* — Mohammad Ali
*Assistant Examiner* — Griselle Corbo
(74) *Attorney, Agent, or Firm* — David W. Victor; Konrad Raynes & Victor LLP

(57) ABSTRACT

A composite storage server employs a plurality of distributed storage sites including a mount site, a source copy site and one or more copy target sites for executing a storage of volume data within the composite storage server. In operation, an immediate copy target site receives a communication of a source copy complete message from the mount site, the source copy complete message being indicative of the source copy site having a complete copy of the volume data. Based on the source copy complete message, the immediate copy target site pulls the volume data from a peer distributed storage site having a complete copy of the volume data (e.g., the source copy site, the mount site or another copy target site).

19 Claims, 13 Drawing Sheets

U.S. PATENT DOCUMENTS

2007/0233840 A1* 10/2007 Alstrup et al. ............... 709/223
2007/0244894 A1* 10/2007 St. Jacques ..................... 707/9
2007/0276873 A1 11/2007 Vahdat et al.
2008/0005258 A1* 1/2008 Sridharan et al. ............ 709/212
2008/0154904 A1 6/2008 Bish et al.

* cited by examiner

IMMEDIATE COPY TARGET PULL OF VOLUME DATA

FIELD OF THE INVENTION

The present invention generally relates to the storage of volume data within a composite storage server. The present invention specifically relates to the storage of volume data within immediate copy target sites of the composite storage server.

BACKGROUND OF THE INVENTION

A composite storage server consists of multiple distributed storage sites for a selective storage of volume data within two or more of the distributed storage sites. Typically, each distributed storage site employs a job director and for any given storage job, one of the distributed storage sites serves as a single source copy site whereby its director, upon completion of the volume data being pushed to its cache, will pull the cached volume data from its cache to thereby push the cached volume data to any of the other distributed storage sites designated as copy target sites for purposes of the storage job.

Clearly, the single source copy site demands significant processing power to being able to pull and push the cached volume data to the copy target sites, particularly in view of a substantial number of copy target sites and any concurrent execution of other storage jobs within the composite storage server. Furthermore, each copy target site has a servant role in terms of being excluded from the decision process by the source copy site of when, where and how fast the volume data is pushed to each copy target site and therefore also demands significant processing power, particularly in view of any concurrent execution of other storage jobs within the composite storage server whereby a copy target site may or may not serve as a source copy site for one or more of those storage jobs. Therefore, it would be invaluable for a composite storage server to incorporate a technique for distributing the responsibility of storing volume data within the composite storage server among the distributed storage sites whereby each distributed storage site involved in the storage of the volume data within the composite storage server is an active participant.

SUMMARY OF THE INVENTION

The present invention provides a new and unique immediate copy target pull of volume data.

A first form of the present invention is a composite storage server comprising a plurality of distributed storage sites including a mount site, a source copy site and at least one copy target site for executing a storage of volume data within the composite storage server. In operation, the immediate copy target site receives a communication of a source copy complete message from the mount site, the source copy complete message being indicative of the source copy site having a complete copy of the volume data. Based on the source copy complete message, the immediate copy target site pulls the volume data from a peer distributed storage site having a complete copy of the volume data (e.g., the source copy site, the mount site or another copy target site).

In a composite storage server comprising a plurality of distributed storage sites including a mount site, a source copy site and at least one copy target site for executing a storage of volume data within the composite storage server, the second form of the present invention is an immediate copy target site comprising a processor, a memory storing instructions operable with the processor. The instructions are executed for receiving a communication of a source copy complete message from the mount site, the source copy complete message being indicative of the source copy site having a complete copy of the volume data, and based on the source copy complete message, for pulling the volume data from a peer distributed storage site having a complete copy of the volume data (e.g., the source copy site, the mount site or another copy target site).

In a composite storage server comprising a plurality of distributed storage sites including a mount site, a source copy site and at least one copy target site for executing a storage of volume data within the composite storage server, the third form of the present invention is a method of operating the immediate copy target site. The method involves the immediate copy target site receiving a communication of a source copy complete message from the mount site, the source copy complete message being indicative of the source copy site having a complete copy of the volume data. Based on the source copy complete message, the method further involves the immediate copy target site pulling the volume data from a peer distributed storage site having a complete copy of the volume data (e.g., the source copy site, the mount site or another copy target site).

The aforementioned forms and additional forms as well as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

Figure 1:
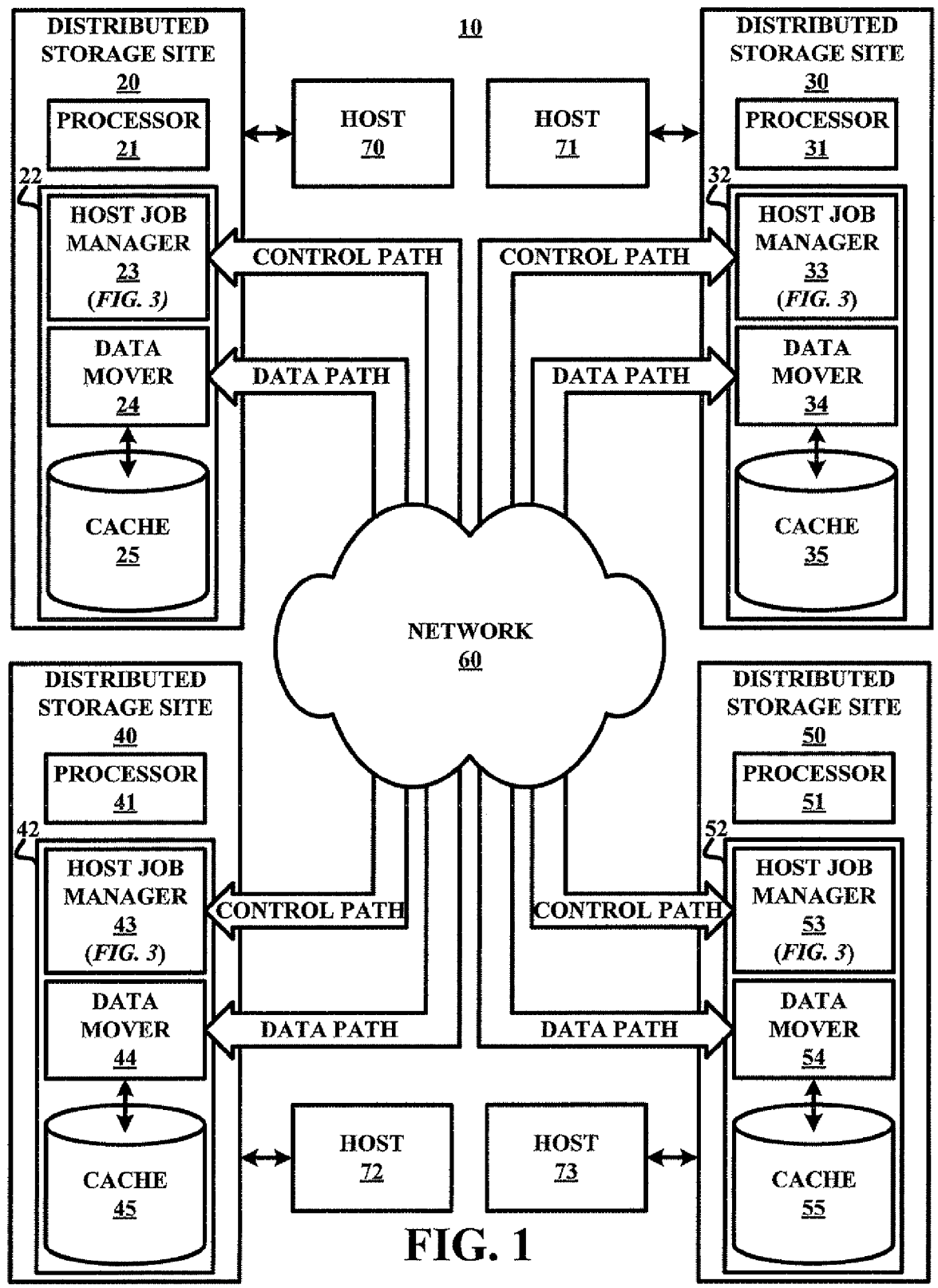
FIG. 1 illustrates an exemplary embodiment of a composite storage server in accordance with the present invention.

FIG. 1 illustrates a composite storage server 10 for storing volume data on behalf of hosts 70-73. To this end, composite storage server 10 employs a distributed storage site 20 connected to host 70, a distributed storage site 30 connected to host 71, a distributed storage site 40 connected to host 72 and a distributed storage site 50 connected to host 73. Distributed storage site 20-50 are interconnected as peer sites by a network 60 via a control path and a data path.

Distributed storage site 20 includes a processor 21 and a memory 22 supporting a host job manager 23, a data mover 24 and a cache 25. Distributed storage site 30 includes a processor 31 and a memory 32 supporting a host job manager 33, a data mover 34 and a cache 35. Distributed storage site 40 includes a processor 41 and a memory 42 supporting a host job manager 43, a data mover 44 and a cache 45. Distributed storage site 50 includes a processor 51 and a memory 52 supporting a host job manager 53, a data mover 54 and a cache 55.

Each host 70-73 from time to time will request an execution of a host job directed to storing or modifying volume data within composite storage server 10 as known in the art. Each host job manager 23-53 is a software/firmware module consisting of instructions stored within its associated memory 22-52 and executable by its associated processor 21-51 for actively participating in the control of a composite storage of a volume data within composite storage server 10 in accordance with the inventive principles of the present invention as will be further described herein. Each data mover 24-54 is a software/firmware module consisting of instructions stored within its associated memory 22-52 and executable by its associated processor 21-51 for moving volume data in and out of its associated cache 25-55 as known in the art.

Each execution of a host job by composite storage server 10 involves one of the distributed storage sites 20-50 serving as a mount site, one or more of the distributed storage sites 20-50 serving as a source copy site, and one or more of the distributed storage sites 20-50 serving as a copy target site, immediate or deferred. For purposes of the present invention, the term "mount site" is broadly defined herein for a given host job as a distributed storage site performing an overall management of an execution of the host job by composite storage server 10. The term "source copy site" is broadly defined herein for the host job as a distributed storage site designated by the mount site for storing a primary copy of volume data pushed to its cache by a host. The term "immediate copy target site" is broadly defined herein for the host job as any distributed storage site designated by the mount site for pulling and storing a secondary copy of volume data from the source copy site or another copy target site prior to a complete execution of the host job. And, the term "a deferred copy target site" is broadly defined herein for the host job as any distributed storage site designated by the mount site for pulling and storing a secondary copy of volume data from the source copy site or another copy target site subsequent to a complete execution of the host job.

Figure 2:
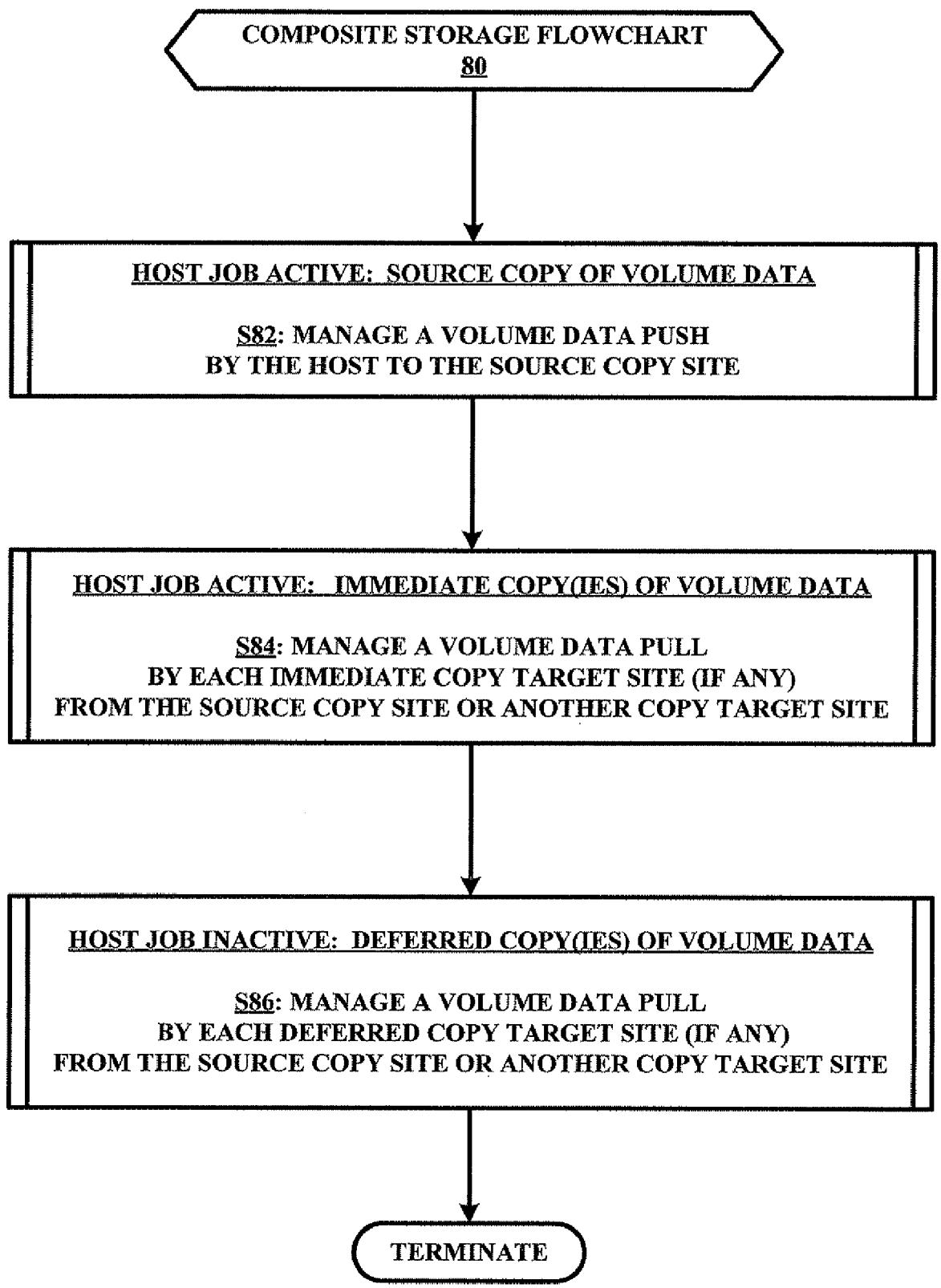
FIG. 2 illustrates a flowchart representative of a general embodiment of a volume data storage method in accordance with the present invention.
Figure 3:
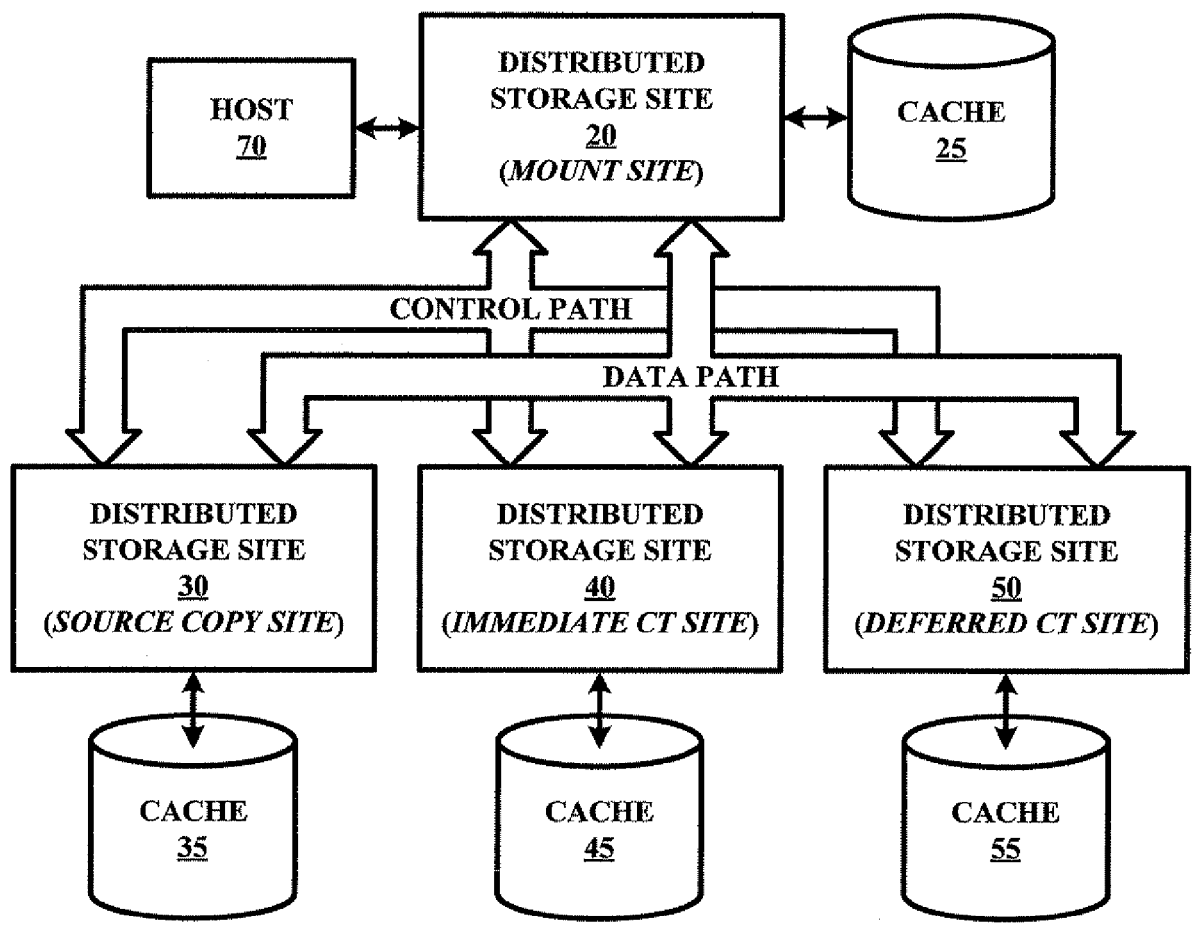
FIG. 3 illustrates an exemplary configuration of the composite storage server illustrated in FIG. 1 prior to an execution of a storage job in accordance with the present invention.

Host job managers 23-53 of respective distributed storage sites 20-50 are structurally configured for distributing the responsibility of storing volume data within composite storage server 10 as embodied in a volume data storage method of the present invention represented by a flowchart 80 illustrated in FIG. 2. To facilitate an understanding of flowchart 80, FIG. 3 illustrates an example of a host job configuration of composite storage server 10. In this illustrated example, distributed storage site 20 serves as mount site for administering an overall management of an execution of the host job by composite storage server 10 as requested by host 70. Distributed storage site 30 serves as a source copy site designated by mount site 20 for storing a primary copy of volume data pushed to its cache 35 by host 70. Distributed storage site 40 serves as an immediate copy target site designated by mount site 20 for pulling and storing a secondary copy of volume data from source copy site 30 prior to a complete execution of the host job. And, distributed storage site 50 serves a deferred copy target site designated by mount site 20 for pulling and storing a secondary copy of volume data from source copy site 30 or immediate copy target site 40 subsequent to a complete execution of the host job.

Referring to FIG. 2, a stage S82 of flowchart 80 is predicated on a mandatory requirement for a source copy of the volume data and thereby encompasses a mount site of the host job managing a volume data push from its associated host to a source copy site. For example, referring to FIG. 3, host job manager 23 (FIG. 1) of mount site 20 utilizes the control path to prepare source copy site 30 for a volume data push from host 70 to cache 35 of source copy site 30 whereby host 70 uses mount site 20 as a conduit to push the volume data to cache 35 via the data path.

Referring again to FIG. 2, a stage S84 of flowchart 80 is predicated on an optional requirement for one or more immediate copies of the volume data during an active state of the host job, and thereby encompasses a mount site prompting each designated immediate copy target site to individually manage a volume data pull from the source copy site or another copy target site having a complete volume data copy. For example, referring to FIG. 3, host job manager 33 (FIG. 1) of source copy site 30 manages cache 35 to provide an availability of the volume data copy, and host job manager 23 of mount site 20 utilizes the control path to prompt host job manager 43 (FIG. 1) of immediate copy target site 40 to manage a volume data pull by immediate copy site 40 of a copy of the volume data from cache 35 of source copy site 30 to cache 45.

Referring again to FIG. 3, a stage S86 of flowchart 80 is predicated on an optional requirement for one or more deferred copies of the volume data during an inactive state of the host job and thereby encompasses a mount site prompting each designated deferred copy target site to individually manage a volume data pull from the source copy site or another copy target site having a complete volume data copy. For example, referring to FIG. 3, host job manager 33 of source copy site 30 and host job manager 43 of immediate copy target site 40 manage respective cache 35 and cache 45 to provide an availability of the volume data copy, and host job manager 23 of mount site 20 utilizes the control path to prompt host job manager 53 (FIG. 1) of deferred copy target site 50 to manage a volume data pull by deferred copy site 50 of a copy of the volume data from cache 35 of source copy site 30 to cache 55 or from cache 45 of immediate copy site 40 to cache 55.

In practice, a host job manger of the present invention can be embodied in a variety of structural forms for implementing flowchart 80 that are dependent upon a designed topology of the composite storage server and the individual structural configurations of each distributed storage site as would be appreciated by those having ordinary skill in the art. Thus, the following description of an exemplary embodiment 90 of a host job manager of the present invention as shown in FIG. 4 is provided to facilitate a further understanding of the inventive principles of the present invention without limiting or restricting in practice the structural forms of a host job manager of the present invention.

Figure 4:
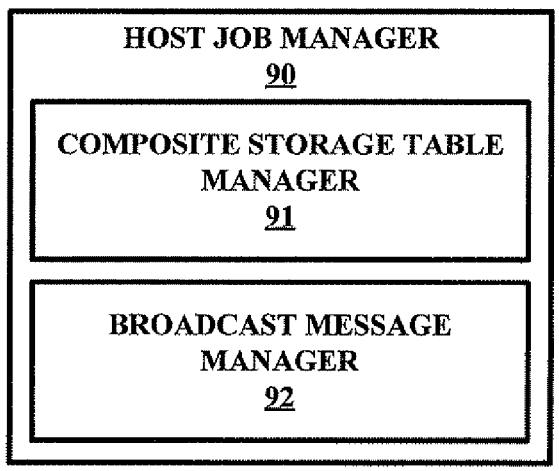
FIG. 4 illustrates one embodiment of a host job manager in accordance with the present invention.

Referring to FIG. 4, host job manager 90 employs a composite storage table manager 91 and a broadcast message manager 92. Composite storage table manager 91 is structurally configured to manage a composite storage table for recording and updating meta-data corresponding to a host job whereby each distributed storage site can effectively and cooperatively fulfill its responsibility in managing a storage of volume data within the composite storage server. Broadcast message manager 92 is structurally configured to manage a broadcast of messages generated by host job manager 90 and to interpret messages received by host job manager 90 in dependence of an associated distributed storage site's responsibility in managing a storage of volume data within the composite storage server. Collectively, composite storage table manager 91 and broadcast message manager 92 implement various management methods of the present invention for an execution of a host job, such as, for example, the various management methods of the present invention represented by the flowcharts illustrated in FIGS. 5, 7, 8, 10, 11 and 13.

Figure 5:
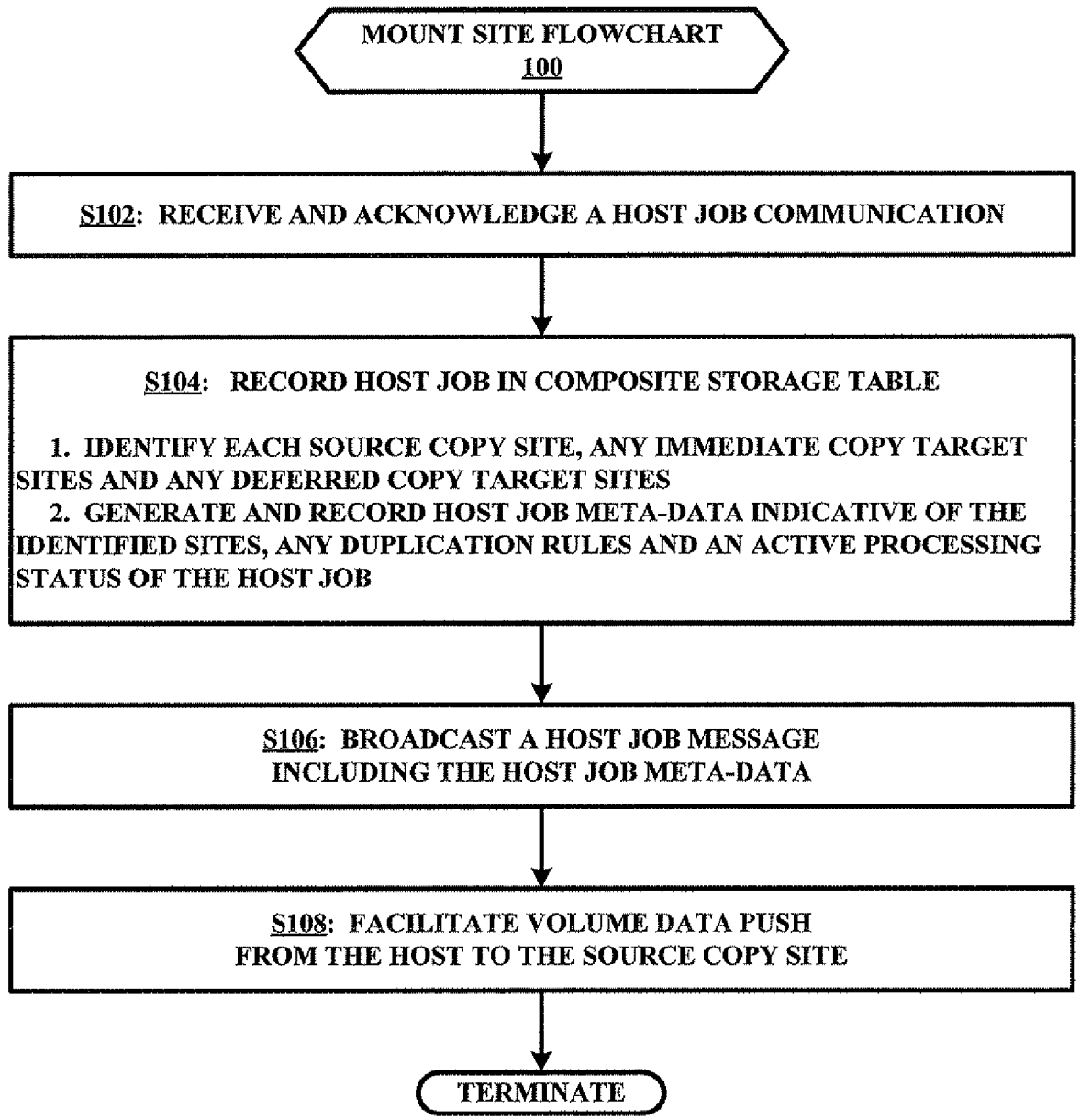
FIG. 5 illustrates a flowchart representative of one embodiment of a mount side pre-source copy management method in accordance with the present invention.

Specifically, FIG. 5 illustrates a flowchart 100 representative of a mount site pre-source copy management method of the present invention that is implemented by a distributed host site serving as a mount site for a particular host job. A stage S102 of flowchart 100 encompasses the host job manager of the mount site receiving and acknowledging a host job communication from an associated host as known in the art. A stage S104 of flowchart 100 encompasses the host storage manager of the mount site recording the host job in its composite storage table. In one embodiment, stage S104 involves the host job manager of the mount site identifying one or more source copy sites, any immediate copy target sites and any deferred copy target sites for executing the host job. In practice, the identification of these sites is in view of obtaining an optimal storage of the volume data within the composite storage server, which is dependent upon a designed topology of the composite storage server and the individual structural configurations of each distributed storage site as would be appreciated by those having ordinary skill in the art.

Figure 6:
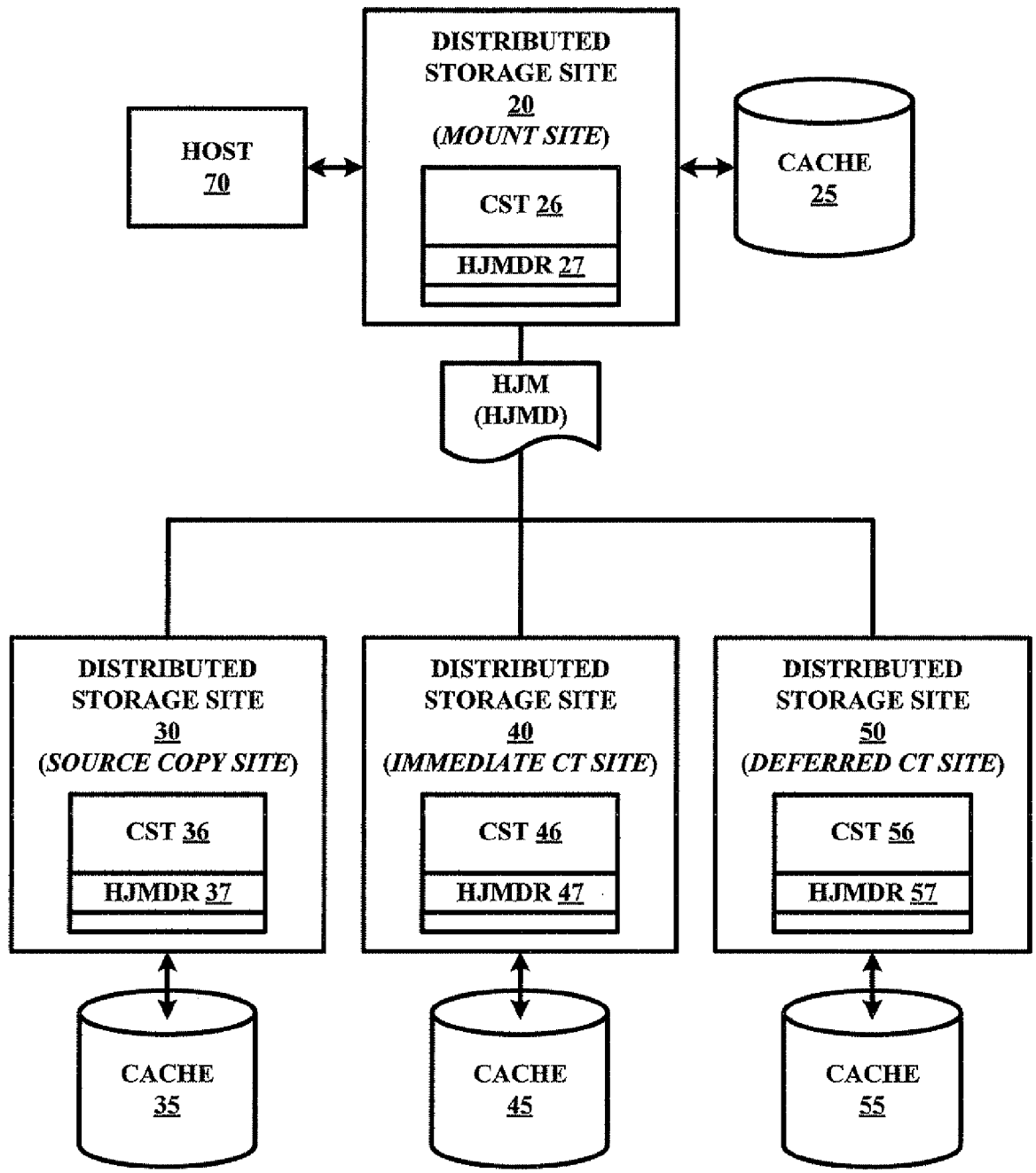
FIG. 6 illustrates an exemplary operational state of the composite storage server illustrated in FIG. 3 based on a host message activation in accordance with the present invention.

In this embodiment, stage S104 further involves a generation and a recording of host job meta-data indicative of the identified sites, duplication rules for the volume data, and an active processing status of the host job. For example, FIG. 6 illustrates mount site 20 generating and recording a host job meta-data record 27 within a composite storage table 26 with the host job meta-data being indicative of distributed storage site 30 serving as the source copy site, distributed storage site 40 serving as an immediate copy target site, and distributed storage site 50 serving as a deferred copy target site. The host job meta-data further indicates duplication rules and an active status of the host job requested by host 70.

Referring again to FIG. 5, a stage S106 of flowchart 100 encompasses the host job manager of the mount site broadcasting a host job message including the host job meta-data to inform the other sites of their roles in the storage of the volume data within the composite storage server and any other necessary information for storing the volume data within the composite storage server. For example, as shown in FIG. 6, the host job manager of mount site 20 broadcasts a host job message HJM including host job meta-data HJMD to sites 30-50.

Figure 7:
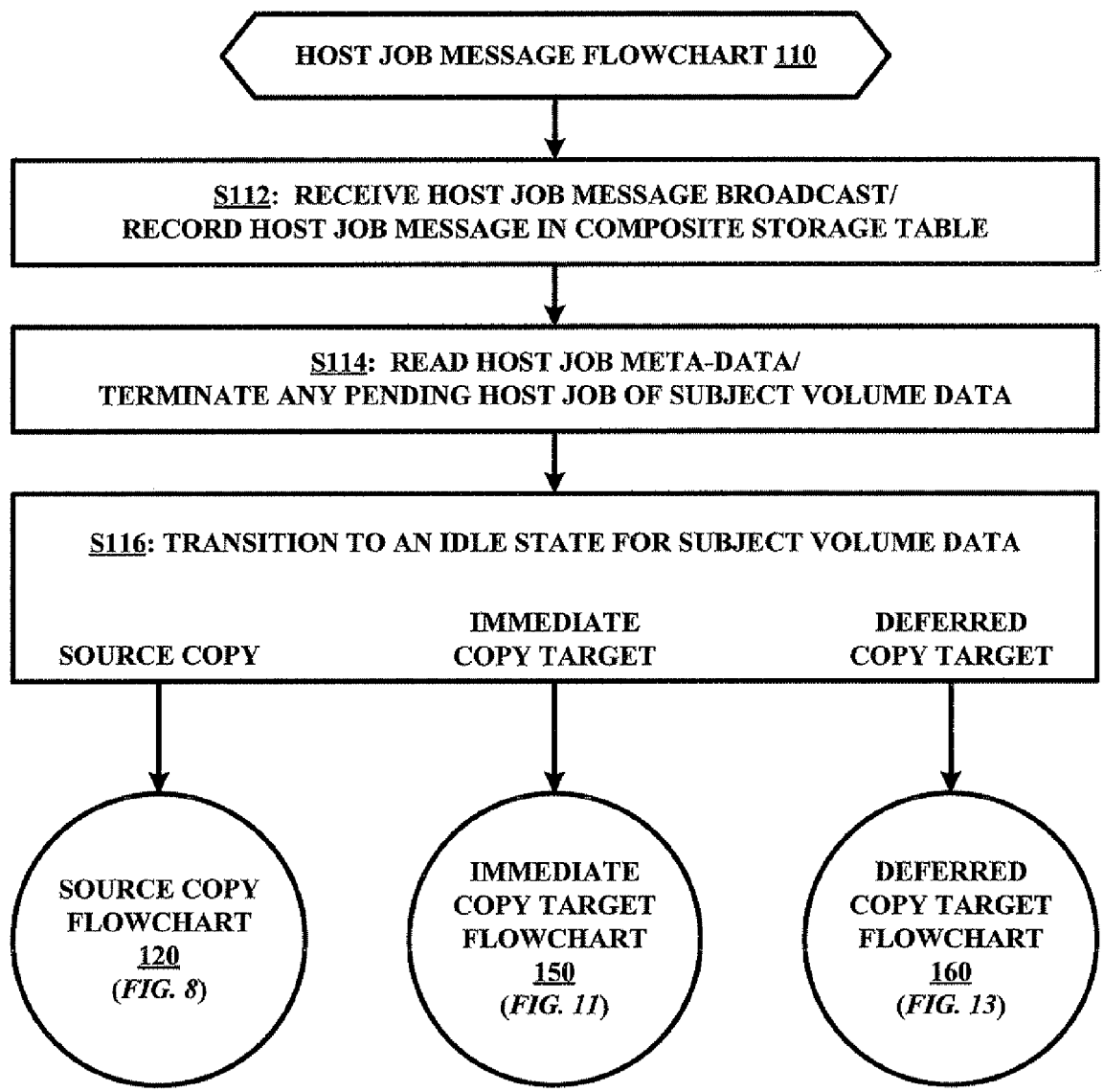
FIG. 7 illustrates a flowchart representative of one embodiment of a host job message activation method in accordance with the present invention.

In response to the host job message broadcast, each distributed storage site (including the mount site) implements a host job message activation method of the present invention as represented by a flowchart 110 illustrated in FIG. 7. Referring to FIG. 7, a stage S112 of flowchart 110 encompasses the host job manager of the distributed storage site(s) receiving the host job message broadcast whereby each host job manager records the host job message in its composite storage table to thereby read the host job message meta-data during a stage S114 of flowchart 110 to determine the subject volume data whereby the host job manager may terminate any pending host job related to the subject volume data.

Thereafter, the host job manager of the distributed storage site(s) proceed to a stage S116 of flowchart 110 to transition to an idle state for the subject volume data. At this stage, each host job manager of a distributed storage site serving in as a source copy site in the storage/modification of the subject volume data in the composite storage server will be activated by the host to implement a flowchart 120 representative of a source copy management method of the present invention as will be subsequently explained in connection with FIG. 8. Each host job manager of a distributed storage site serving in as an immediate copy target site in the storage/modification of the subject volume data in the composite storage server will be activated by the mount site to implement a flowchart 150 representative of a immediate copy management method of the present invention as will be subsequently explained in connection with FIG. 11. And, each host job manager of a distributed storage site serving in as a deferred copy target site in the storage/modification of the subject volume data in the composite storage server will be activated by the mount site to implement a flowchart 160 representative of a deferred copy management method of the present invention as will be subsequently explained in connection with FIG. 13.

Figure 8:
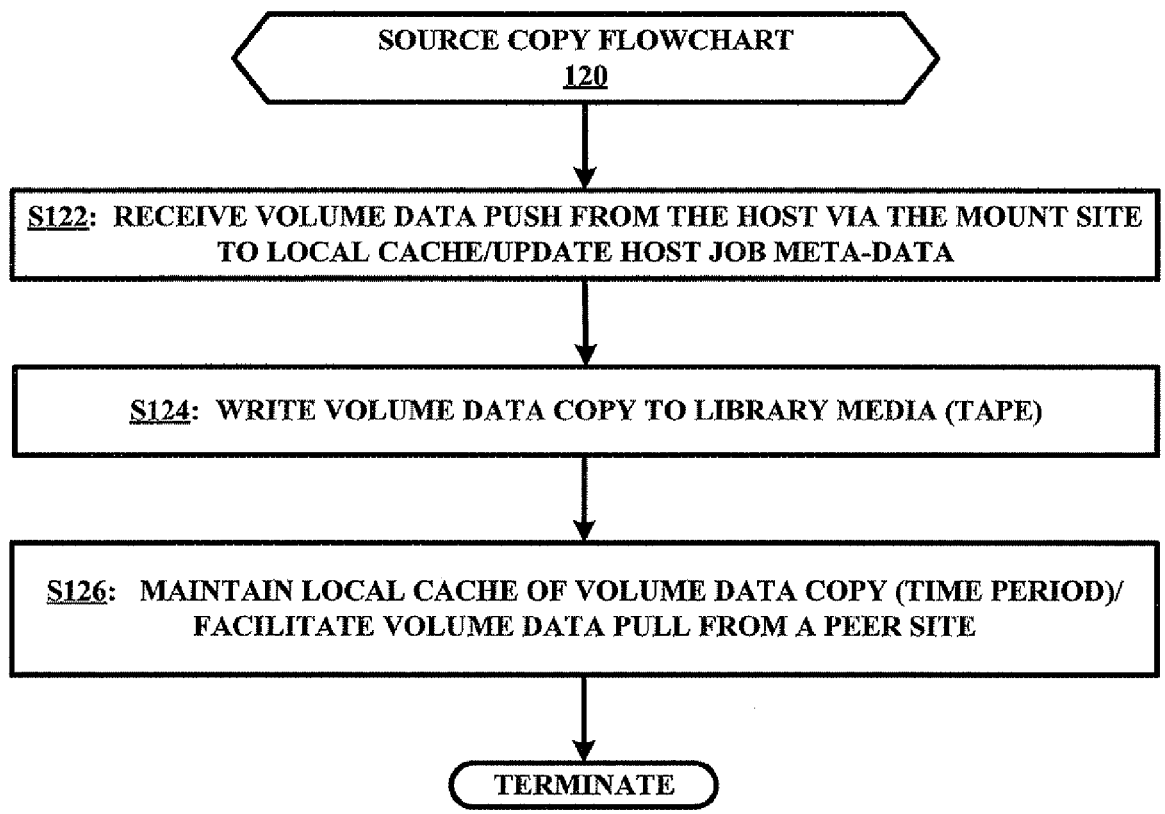
FIG. 8 illustrates a flowchart representative of one embodiment of a source copy management method in accordance with the present invention.
Figure 11:
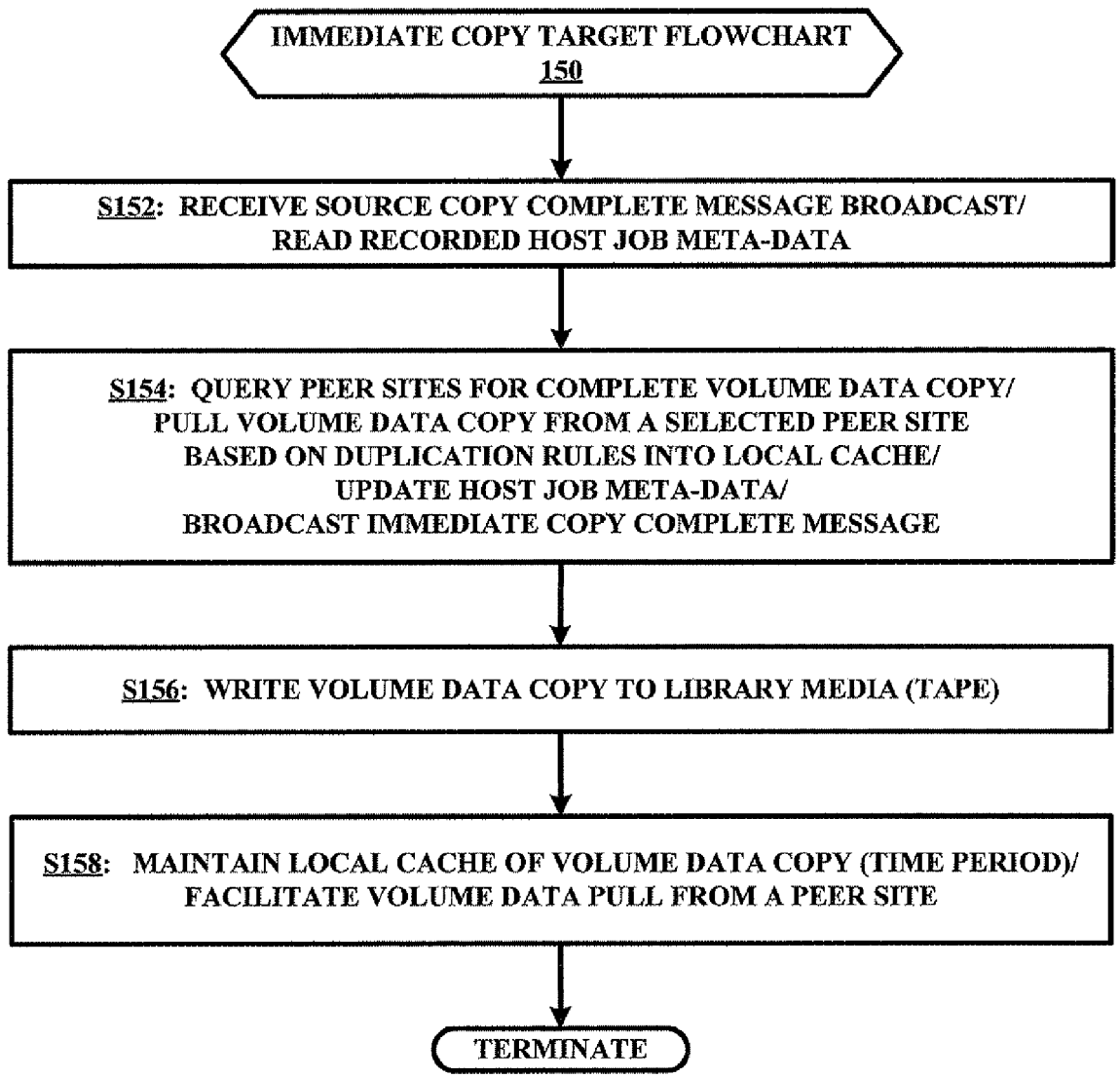
FIG. 11 illustrates a flowchart representative of one embodiment of an immediate copy management method in accordance with the present invention.
Figure 13:
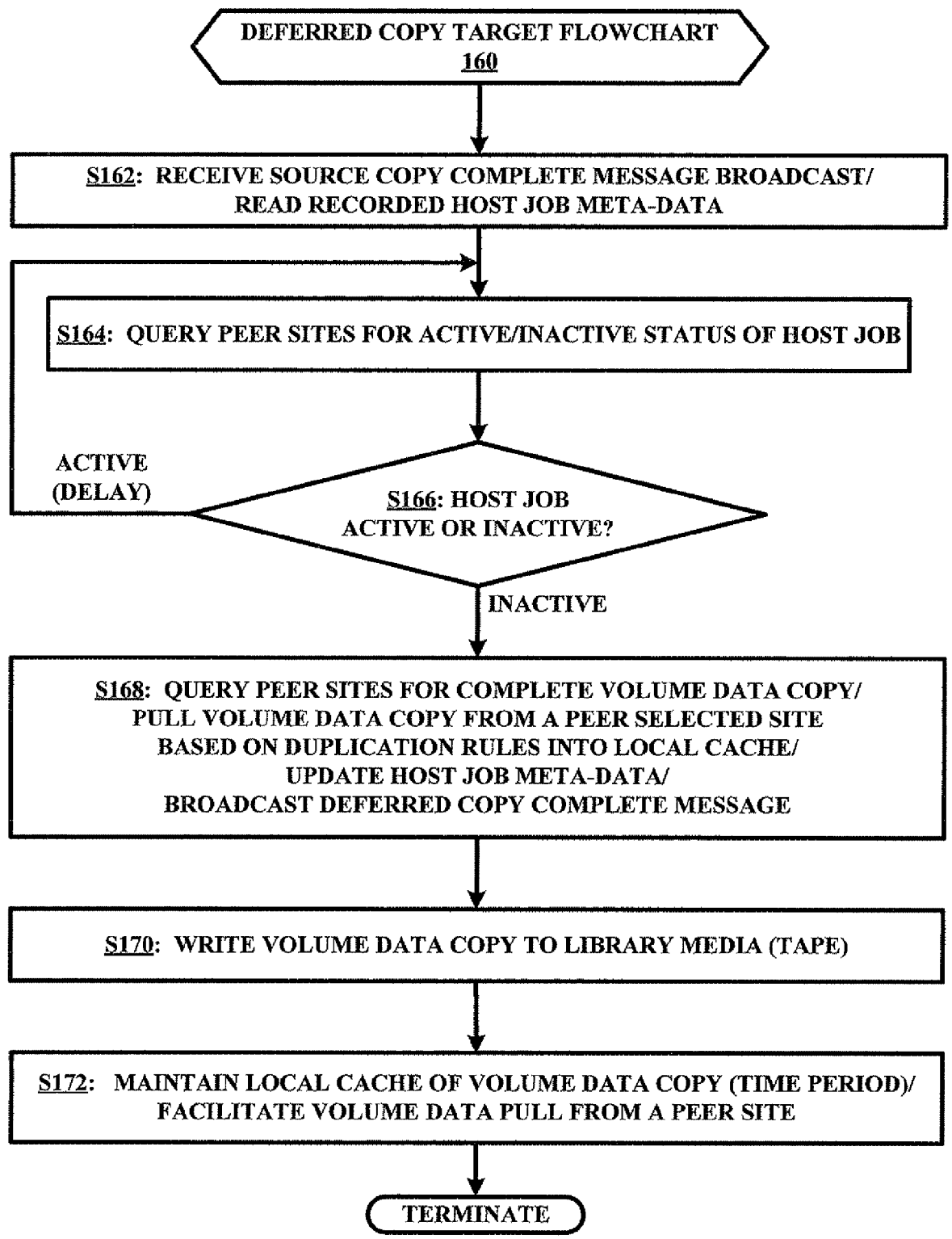
FIG. 13 illustrates a flowchart representative of one embodiment of a deferred copy management method in accordance with the present invention.

For example, as shown in FIG. 6, the host job manager of distributed storage site 20 would determine that mount site 20 does not have a copy role in the storage of the volume data within composite storage server 10 and therefore would terminate flowchart 110 yet save the host job meta-data to thereby track any changes to the host job meta-data related to the execution of the host job by the other sites. The host job manager of distributed storage site 30 would determine that site 30 is serving as the source copy site in the storage of the volume data within composite storage server 10, record a host job meta-data record 37 in a composite storage table 36 and transition to an idle state for the subject volume data to thereby passively await an activation by host 70 to implement flowchart 120 (FIG. 8). The host job manager of distributed storage site 40 would determine that site 40 is serving as an immediate copy target site in the storage of the volume data within composite storage server 10, record a host job meta-data record 47 in a composite storage table 46 and transition to an idle state for the subject volume data to thereby passively await an activation by mount site 20 to implement flowchart 150 (FIG. 11). And, the host job manager of distributed storage site 50 would determine that site 50 is serving as a deferred copy target site in the storage of the volume data within composite storage server 10, record a host job meta-data record 57 in a composite storage table 56 and transition to an idle state for the subject volume data thereby passively await an activation by mount site 20 to implement flowchart 160 (FIG. 13).

Referring to FIGS. 5 and 8, subsequent to the host job message broadcast, a stage S108 of flowchart 100 encompasses the mount site managing a volume data push from the host to the source copy site. This activates the host job manager of the source copy site to receive the volume data push from the host via the mount site during a stage S122 of flowchart 120. The volume data push includes the volume data and other essential information, and in response thereto, the host job manager of the source copy site updates the host job meta-data to reflect the volume data push. This enables the host job manager of the source copy site to write the volume data to a library media (e.g., tape) during a stage S124 of flowchart 120 and to maintain the volume data within its associated local cache for a specified time period during a stage S126 of flowchart 120 to thereby facilitate a volume data pull from each peer site attempting to pull a complete volume data copy from the source copy site.

Figure 9:
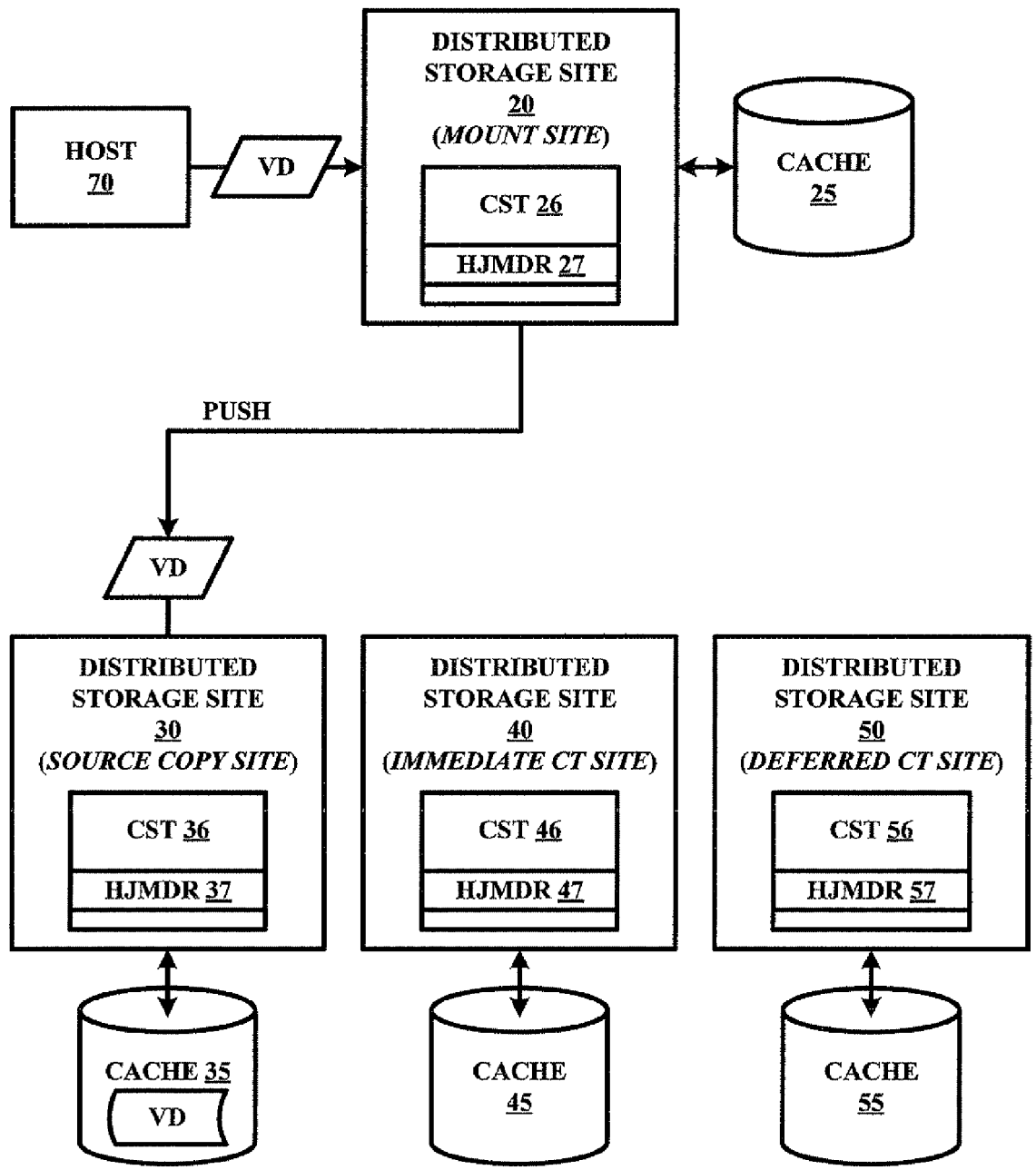
FIG. 9 illustrates an exemplary operational state of the composite storage server illustrated in FIG. 3 based on a host volume data push in accordance with the present invention.

For example, as shown in FIG. 9, the host job manager of mount site 20 manages mount site 20 in serving as a conduit for a volume data push of volume data VD and other essential information from host job 70 to cache 35 of source copy site 30 whereby the host job manager of source copy site 30 updates host job meta-data record 37 to reflect the volume data push. Thereafter, the host job manager of source copy site 30 writes volume data VD to tape residing at site 30 and maintains volume data VD within cache 35 for a specified time period to thereby facilitate any attempted volume data pulls from immediate copy target site 40 and/or deferred copy target site 50.

Figure 10:
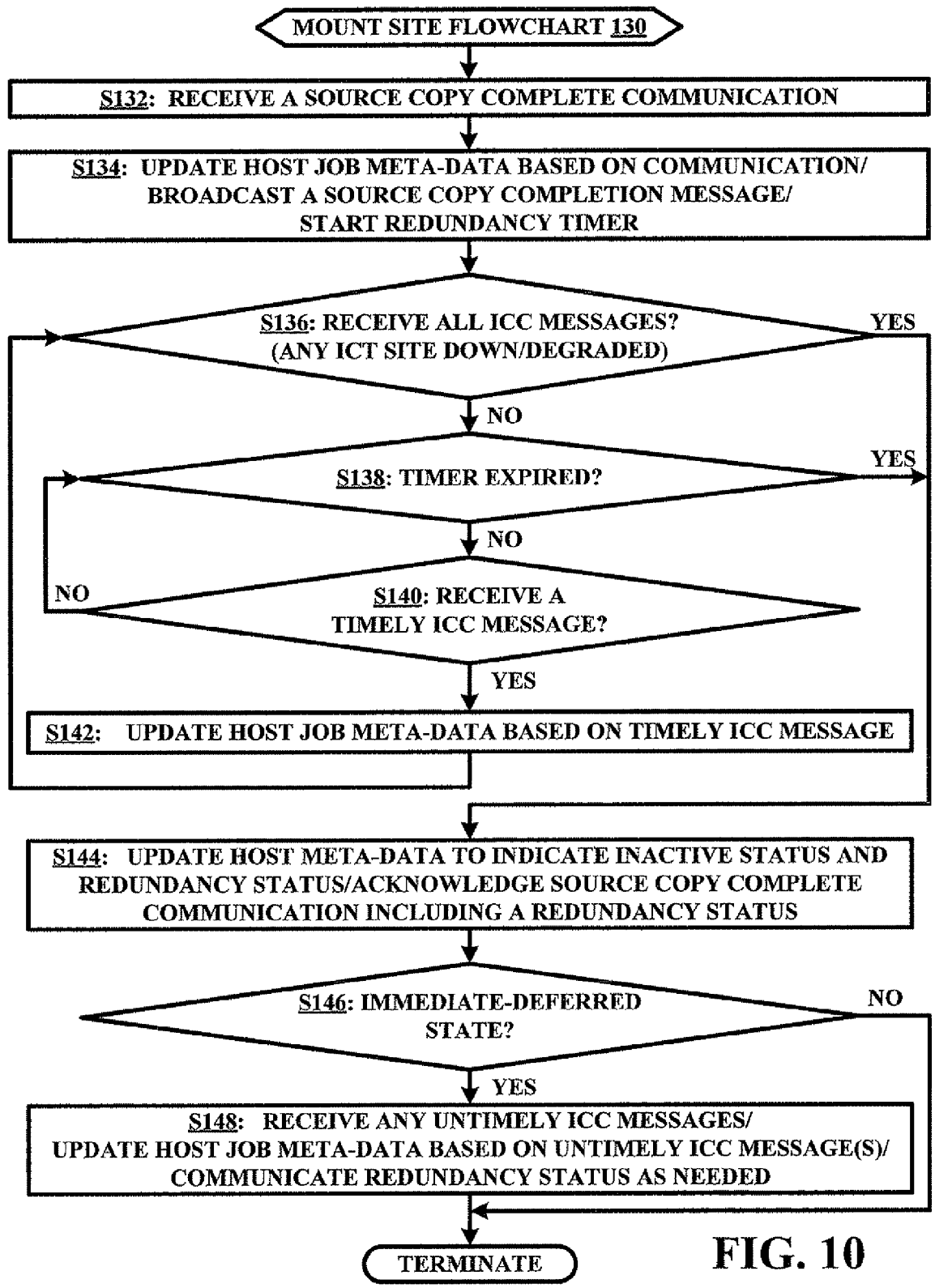
FIG. 10 illustrates a flowchart representative of one embodiment of a mount side post-source copy management method in accordance with the present invention.

Upon completion of the source copy at the source copy site, the mount site implements a mount site post-source copy management method represented by a flowchart 130 illustrated in FIG. 10. A stage S132 of flowchart 130 encompasses the host job manager of the mount site receiving a source copy completion communication from the host whereby the host job manager of the mount site proceeds to a stage S134 of flowchart 130 to update the host job meta-data based on the communication, to broadcast a source copy complete message on the network for purposes of activating any immediate copy target sites to execute flowchart 150, and to switch on a timer for purposes of monitoring the immediate copy target site(s).

Referring to FIG. 11, a stage S152 of flowchart 150 encompasses the host job manager of each immediate copy target site receiving the source copy complete message broadcast whereby the host job manager of each immediate copy target site reads the recorded host job meta-data to facilitate a determination by the immediate copy target site of which peer site to pull the volume data to the immediate copy target site in accordance with its internal data processing rules. Upon reading the host job meta-data, the host job manager of the immediate copy target site proceeds to a stage S154 of flowchart 150 to query its peer sites for a complete copy of the volume data. Upon selecting a peer site having a complete volume data copy, the host job manager of the immediate copy target site will execute a volume data pull from the selected peer site in accordance with its internal processing rule and the duplication rules, update the host job meta-data to reflect the volume data pull and broadcast a copy target complete message on the network. This enables the host job manager of the immediate copy site to write the volume data to library media (e.g., tape) during a stage S156 of flowchart 150 and to maintain the volume data within its associated local cache for a specified time period during a stage S158 of flowchart 150 to thereby facilitate a volume data pull from each peer site attempting to pull a complete volume data copy from the immediate copy target site.

Figure 12:
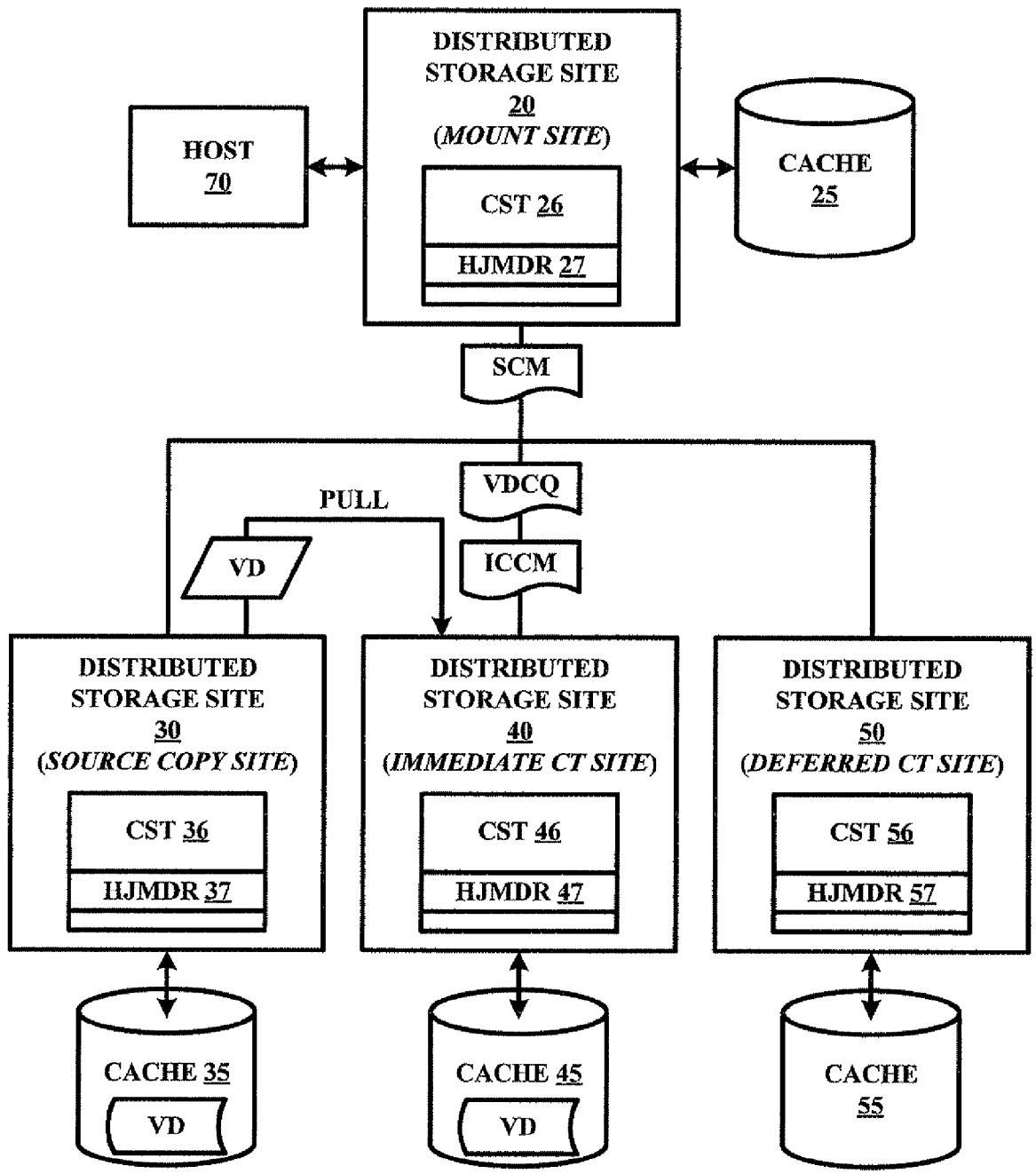
FIG. 12 illustrates an exemplary operational state of the composite storage server illustrated in FIG. 3 based on an immediate copy target volume data pull in accordance with the present invention.

For example as shown in FIG. 12, the host job manager of mount site 20 broadcasts a source copy complete message SCM on the network that activates the host job manager of immediate copy target site 40 to broadcast a volume data copy query VDCQ based on the host job meta-data whereby the host job manager of immediate copy target site 40 would determine a copy of the volume data is located at source copy site 30 and therefore would manage a pull of volume data from cache 35 to cache 45 and broadcast a copy target complete message CTCM upon completion of the volume data pull. Thereafter, the host job manager of immediate copy target site 40 writes volume data VD to a library media (e.g., tape) residing at site 40 and may maintain volume data VD within cache 45 for a specified time period to thereby facilitate any attempted volume data pull from deferred copy target site 50.

Referring again to FIG. 10, the host job manager of the mount site monitors the activities of each immediate copy target site based on the redundancy timer for purposes of providing a redundancy status to the host.

During an initial execution of a stage S136 of flowchart 130, the host job manager of the mount site determines, immediately upon starting the redundancy timer, whether a total number of immediate copy complete ("ICC") messages indicative of an adequate redundancy in accordance with the host job meta-data have been received by the mount site. In one embodiment, a total number of immediate copy complete messages to be received by the host job manager of the mount site in accordance with the host job meta-data is less than or equal to the total number of immediate copy target sites whereby the total number of immediate copy complete messages may be adjusted to reflect each immediate copy target site in a down/degraded state.

If it is determined by the host job manager of the mount site during stage S136 that actual number of received immediate copy complete messages is less than the total number of immediate copy complete messages to be received by the mount site, then the host job manager of the mount site proceeds to execute stages S136-S142 to receive any timely immediate copy complete message and to update the host job meta-data based on each timely received immediate copy complete message until such time either (1) the total number of immediate copy complete message to be received by the host job manager of the mount site have been received or (2) the redundancy timer has expired. In one embodiment, the host job manager of the mount site executes stages S136-S142 in a passive manner whereby the host job manager of the mount site is prompted to react to any timely received immediate copy complete message, an expiration of the redundancy timer and any messages/indications that an immediate copy target site is in a down/degraded state.

Upon the total number of immediate copy complete messages being received by the mount site or an expiration of the redundancy timer, the host job manager of the mount site proceeds to a stage S144 of flowchart 140 to update the host job meta-data to indicate an inactive status of the host job and a redundancy status of the volume data, and to acknowledge the source copy communication from the host including a redundancy status. The redundancy status will reflect an adequate redundancy if all of the required immediate copy complete message were received by the host site prior to the expiration of the redundancy timer whereby the host job manager of the mount site proceeds to terminate flowchart 130.

Alternatively, the redundancy status will reflect an inadequate redundancy if all of the required immediate copy complete message were not received by the host site prior to the expiration of the timer whereby the host job manager of the mount site transitions the composite storage server to an immediate-deferred state during a stage S146 of flowchart 140 to thereby proceed to a stage S148 of flowchart 140 to receive any untimely immediate copy complete messages. In response thereto, the host job manager of the mount site updates the host job meta-data and reports the redundancy status to host 70 as needed.

For example, referring to FIG. 12, mount site 20 determine one immediate copy complete message ICCM from immediate copy target site 40 is preferred to be received by mount site 20 prior to the expiration of the redundancy timer. Assuming immediate copy target site 40 is not in a down/degraded state, if the copy target complete message ICCM from immediate copy target site 40 is received by mount site 20 prior to the expiration of the timer, then mount site 20 will acknowledge the source copy complete communication by host 70 with a redundancy status indicating an adequate number of secondary copies of the volume data are stored within the composite storage server. Otherwise, if the copy target complete message ICCM from immediate copy target site 40 is not received by mount site 20 prior to the expiration of the timer, then mount site 20 will acknowledge the source copy complete communication by host 70 with a redundancy status indicating an inadequate number of secondary copies of the volume data are stored within the composite storage server. As a result, the host job manager of mount site 20 will transition composite storage server 10 to an immediate-deferred state that is maintained until such time the immediate copy complete message ICCM is sent by immediate copy target site 40 to mount site 20.

Referring to FIG. 10, the inactive processing status of the host job as set by the mount site upon expiration of the timer during stage S144 signifies the conclusion of the active status of the host job. This activates each deferred copy target site to manage a pull of the volume data from the source copy site or a copy target site having a complete copy of the volume data. Specifically, FIG. 13 illustrates a deferred copy management method of the present invention represented by a flowchart 160. A stage S162 of flowchart 160 encompasses the host job manager of the deferred copy target site receiving the source copy complete message broadcast from the mount site whereby the host job manager reads the recorded host job meta-data to facilitate a determination by the deferred copy target site of which peer site to pull the volume data to the deferred copy target site in accordance with its internal data processing rules. Upon reading the host job meta-data, the host job manager of the deferred copy target site proceeds of stage S164 to query its peer sites for an active/inactive status of the host job. The host job manager of the deferred copy target site will receive the current status of the host job from the mount site whereby the host manager of the deferred copy target site will proceed to a stage S1168 of flowchart 160 upon detecting an inactive status of the host job during a stage S166 of flowchart 160 or at is discretion, repeatedly query its peer sites for the active/inactive status until such time the host job manager of the deferred copy target site detects an inactive status of the host job.

During stage S168, the host job manager of the deferred copy target site queries its peer sites for a complete copy of the volume data. Upon selecting a peer site having a complete volume data copy, the host job manager of the deferred copy target site will execute a volume data pull from the selected peer site in accordance with its internal processing rule and the duplication rules, update the host job meta-data to reflect the volume data pull and broadcast a deferred copy complete message on the network. This enables the host job manager of the deferred copy site to write the volume data copy to library media (e.g., tape) during a stage S170 of flowchart 160 and to maintain the volume data within its associated local cache for a specified time period during a stage S172 of flowchart 160 to thereby facilitate a volume data pull from each peer site attempting to pull a complete volume data copy from the deferred copy target site.

Figure 14:
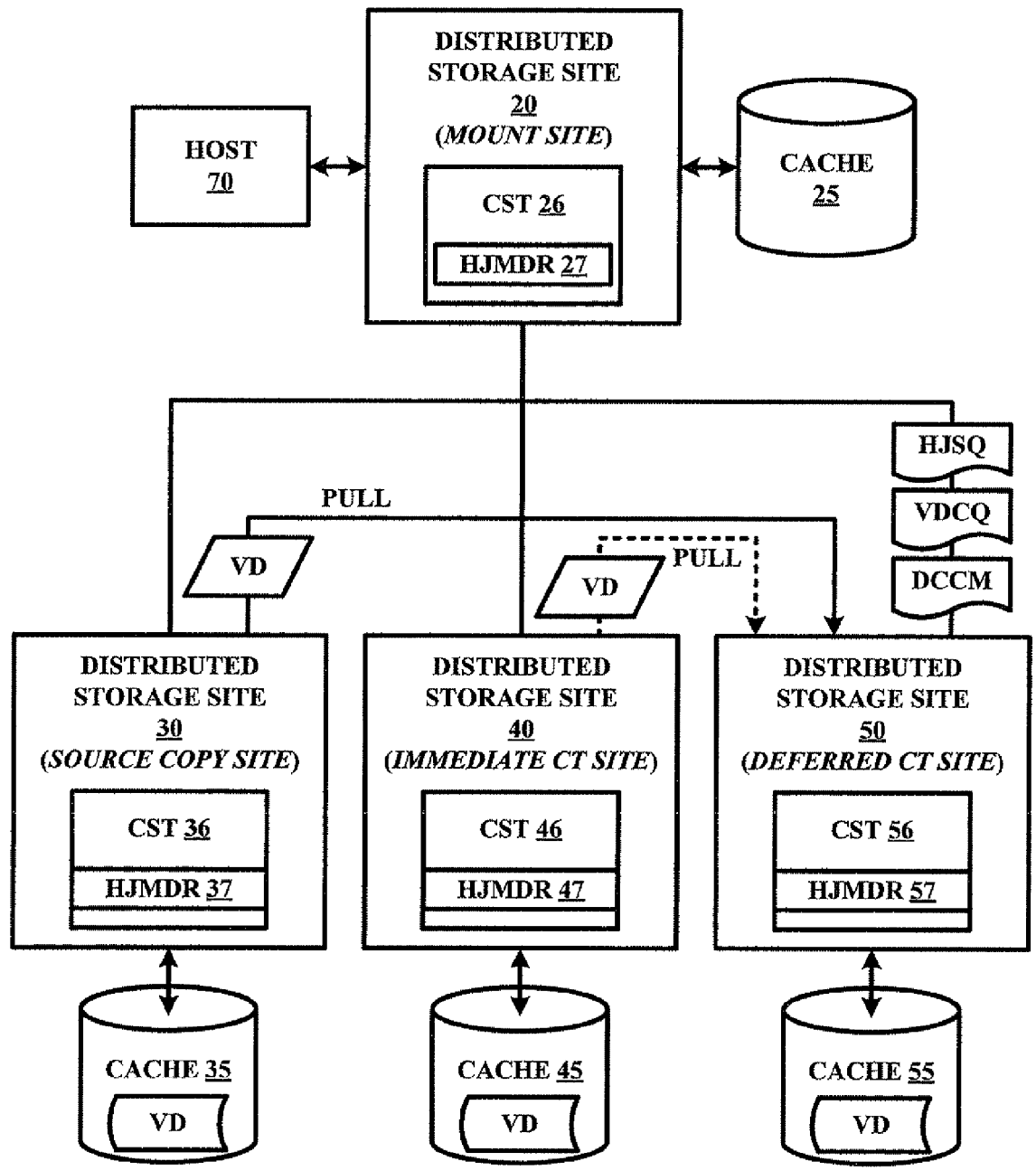
FIG. 14 illustrates an exemplary operational state of the composite storage server illustrated in FIG. 3 based on a deferred copy target volume data pull in accordance with the present invention.

For example as shown in FIG. 14, the host job manager of deferred copy target site 50 broadcast a host job status quest HJSQ on the network and upon detecting an inactive host job status, broadcast volume data copy query VDCQ based on the host job meta-data whereby the host job manager of deferred copy target site 50 would determine a complete copy of the volume data is located at source copy site 30 and immediate copy target site 40, and therefore would manage a pull of volume data from cache 35 or cache 45 to cache 55 and broadcast a deferred copy complete message DCCM upon completion of the volume data pull. Thereafter, the host job manager of deferred copy target site 50 writes volume data VD to tape residing at site 50 and maintain volume data VD within cache 55 for a specified time period to thereby facilitate any attempted volume data pull from a peer site.

Referring to FIGS. 1-14, those having ordinary skill in the art will appreciate how to implement the various inventive principles of the present invention for a more or less complex composite storage server than composite storage server 10 shown in FIG. 1, and in a more or less complex host environment than hosts 70-73 shown in FIG. 1. Furthermore, those having ordinary skill in the art will appreciate various advantages of the present invention including, but not limited to, an active participation to some degree of each distributed storage site of a composite storage server involved in a storage of a particular volume data within the server.

Still referring to FIGS. 1-14, is to be also appreciated by those having ordinary skill in the art that (1) a mount site may also serve as a source copy site or a copy target site during the execution of a host job, (2) a storing of volume data within a composite storage server under the inventive principles of the present invention is inclusive of an original storage of the volume data within the composite storage server, an modification/replacement of the volume data as previously stored within the composite storage server and/or a modification of a data structure/properties of the volume data as stored within the composite storage server, and (3) only one copy target site, immediate or deferred, is required for any given host job to maintain redundancy.

The term "processor" as used herein is broadly defined as one or more processing units of any type for performing all arithmetic and logical operations and for decoding and executing all instructions related to facilitating an implementation by a host job manager of the various volume data storage methods of the present invention. Additionally, the term "memory" as used herein is broadly defined as encompassing all storage space in the form of computer readable mediums of any type within distribution storage sites.

Those having ordinary skill in the art of volume data storage techniques may develop other embodiments of the present invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A composite storage server, comprising:
a plurality of interconnected peer distributed storage sites including a mount site, a source copy site and at least one copy target site for executing a host job involving a storage of volume data within the composite storage server;
wherein the mount site is operable to communicate a source copy complete message to an immediate copy target site, the source copy complete message being indicative of the source copy site having a complete copy of the volume data, wherein the source copy site is designated by the mount site for storing a primary copy of the volume data;
wherein the immediate copy target site queries the peer distributed storage sites to determine one of the peer distributed storage sites having the complete copy of the volume data to pull in response to the source copy complete message, wherein the immediate copy target site pulls the volume data from the determined peer distributed storage site having the complete copy of the volume data, and wherein the immediate copy target site pulls and stores the volume data prior to a complete execution of the host job;
wherein the immediate copy target site is further operable to communicate an immediate copy complete message to the mount site, the immediate copy complete message being indicative of the immediate copy target site having the complete copy of the volume data; and
wherein the mount site is further operable to indicate a redundancy status of the composite storage server as having an adequate redundancy based on the mount site receiving the immediate copy complete message from the immediate copy target site prior to an expiration of a redundancy copy timer.

2. The composite storage server of claim 1,
wherein the source copy site is operable to receive a push of the volume data from a host; and
wherein, subsequent to the push of the volume data to the source copy site from the host, the mount site is operable to communicate the source copy complete message to the immediate copy target site.

3. The composite storage server of claim 1, wherein the determined peer distributed storage site is the source copy site.

4. The composite storage server of claim 1, wherein the determined peer distributed storage site is the mount site.

5. The composite storage server of claim 1, wherein the determined peer distributed storage site is one of the copy target sites.

6. The composite storage server of claim 1, wherein, based on the immediate copy complete message, the mount site is further operable to transition the host job from an active state to an inactive state.

7. The composite storage server of claim 6,
wherein the mount site is further operable to transition the composite storage server from the adequate redundancy status to an immediate-deferred state based on the mount site receiving the immediate copy complete message from the immediate copy target site subsequent to an expiration of a redundancy copy timer.

8. The composite storage server of claim 1, wherein each distributed storage site includes a composite storage table for recording host job meta-data serving as a basis for a participation by each distributed storage site in the execution of the host job.

9. In a composite storage server comprising a plurality of interconnected peer distributed storage sites including a mount site, a source copy site and at least one copy target site for executing a host job involving a storage of volume data within the composite storage server, an immediate copy target site comprising:
a processor; and
a memory storing instructions operable with the processor, the instructions executed for:
receiving a communication of a source copy complete message from the mount site, the source copy complete message being indicative of the source copy site having a complete copy of the volume data, wherein the source copy site is designated by the mount site for storing a primary copy of the volume data;
querying by the immediate copy target site the peer distributed storage sites to determine one of the peer distributed storage sites having the complete copy of the volume data to pull in response to the source copy complete message;
pulling, by the immediate copy target site, the volume data from the determined peer distributed storage site having the complete copy of the volume data, wherein the immediate copy target site pulls and stores the volume data prior to a complete execution of the host job;
communicating, by the immediate copy target site, an immediate copy complete message to the mount site, the immediate copy complete message being indicative of the immediate copy target site having the complete copy of the volume data; and
indicating, by the mount site, that a redundancy status of the composite storage server has an adequate redundancy based on the mount site receiving the immediate copy complete message from the immediate copy target site prior to an expiration of a redundancy copy timer.

10. The immediate copy target site of claim 9, wherein the determined peer distributed storage site is the source copy site.

11. The immediate copy target site of claim 9, wherein the determined peer distributed storage site is the mount site.

12. The immediate copy target site of claim 9, wherein the determined peer distributed storage site is one of the copy target sites.

13. The immediate copy target site of claim 9, wherein the instructions are further executed for:
recording host job meta-data in a composite storage table, the host job meta-data serving as a basis for a participation by the immediate copy target site in the execution of the host job.

14. In a composite storage server comprising a plurality of interconnected peer distributed storage sites including a mount site, a source copy site and at least one copy target site for executing a host job involving a storage of volume data within the composite storage server, a method of operating an immediate copy target site comprising:
the immediate copy target site receiving a communication of a source copy complete message from the mount site, the source copy complete message being indicative of the source copy site having a complete copy of the volume data, wherein the source copy site is designated by the mount site for storing a primary copy of the volume data;
the immediate copy target site querying the peer distributed storage sites to determine one of the peer distributed storage sites having the complete copy of the volume data to pull in response to the source copy complete message;

the immediate copy target site pulling the volume data from the determined peer distributed storage site having the complete copy of the volume data, and wherein the immediate copy target site pulls and stores the volume data prior to a complete execution of the host job;

the immediate copy target site communicating an immediate copy complete message to the mount site, the immediate copy complete message being indicative of the immediate copy target site having the complete copy of the volume data; and the mount site indicating a redundancy status of the composite storage server as having an adequate redundancy based on the mount site receiving the immediate copy complete message from the immediate copy target site prior to an expiration of a redundancy copy timer.

15. The method of claim 14, wherein the determined peer distributed storage site is the source copy site.

16. The method of claim 14, wherein the determined peer distributed storage site is the mount site.

17. The method of claim 14, wherein the determined peer distributed storage site is one of the copy target sites.

18. The method of claim 14, further comprising:
recording host job meta-data in a composite storage table, the host job meta-data serving as a basis for a participation by the immediate copy target site in the execution of the host job.

19. A composite storage server, comprising:
a plurality of interconnected peer distributed storage sites including a mount site, a source copy site and at least one copy target site for executing a host job involving a storage of volume data within the composite storage server;

wherein the mount site is operable to communicate a source copy complete message to an immediate copy target site, the source copy complete message being indicative of the source copy site having a complete copy of the volume data, wherein the source copy site is designated by the mount site for storing a primary copy of the volume data;

wherein the immediate copy target site queries the peer distributed storage sites to determine one of the peer distributed storage sites having the complete copy of the volume data to pull in response to the source copy complete message, and wherein the immediate copy target site pulls the volume data from the determined peer distributed storage site having the complete copy of the volume data, and wherein the immediate copy target site pulls and stores the volume data prior to a complete execution of the host job; and wherein a host job manager performs:
in response to determining that the host job is executing in one of the distributed storage sites comprising the source copy site, transition to an idle state to wait for activation by a host to function as the source copy site for storing a primary copy of the volume;

in response to determining that the host job is executing in one of the distributed storage sites comprising the immediate copy target site, transition to an idle state to wait for activation to function as an immediate copy target site that stores a copy from the source copy site prior to a complete execution of the host job; and in response to determining that the host job is executing in one of the distributed storage sites comprising a deferred copy target site, transition to an idle state to wait for activation to function as an immediate copy target site that stores a copy from the source copy site subsequent to a complete execution of the host job.

* * * * *